Patented Jan. 11, 1938

2,105,284

UNITED STATES PATENT OFFICE 2,105,284

STABILIZATION OF UNSATURATED CARBONYLIC COMPOUNDS

Herbert P. A. Groll and George Hearne, Berkeley, Calif., assignors to Shell Development Company, San Francisco, Calif., a corporation of Delaware No Drawing. Application February 24, 1936, Serial No. 65,412

4 Claims. (Cl. 23—250)

This invention relates to the preservation and stabilization against polymerization of readily polymerizable unsaturated organic compounds, and it more particularly relates to a method for the stabilization of readily polymerizable unsaturated carbonylic compounds, particularly those members of the group of unsaturated aldehydes and unsaturated carboxylic acids which possess an unsaturated tertiary carbon atom linked directly to a carbonyl group, and it also relates to the resulting stabilized compositions.

An object of the invention is to provide a class of organic compounds which when added to readily polymerizable unsaturated carbonylic compounds, as such or in admixture with other substances, will substantially retard their polymerization and/or deterioration on standing or by exposure to light, air, elevated temperatures and the like. A further object of the invention is to provide a practical and economical process for the substantial stabilization against polymerization of members of a class of readily polymerizable unsaturated carbonylic compounds, which class embraces unsaturated aldehydes and unsaturated carboxylic acids which possess an unsaturated tertiary carbon atom linked directly to a carbonyl group of the unsaturated compound. The members of this class of unsaturated carbonylic compounds have, by virtue of the possession of an unsaturated tertiary carbon atom linked to a carbonyl group, such a great tendency to rapidly and substantially polymerize to useless polymers, even under conditions normally inhibitive to the polymerization of unsaturated compounds devoid of this characteristic active structure, that the known methods of stabilizing organic compounds are ineffective to inhibit their polymerization.

The present invention provides a process of inhibiting the polymerization of unsaturated carbonylic compounds of the class consisting of unsaturated aldehydes and unsaturated carboxylic acids possessing an olefinic linkage between two aliphatic carbon atoms one of which is tertiary and linked directly to a carbonyl group, said process comprising incorporating with the unsaturated carbonylic compound or compounds, by mixing or other suitable means, a substantial amount of a phenolic compound, whereby the carbonylic material is stabilized against excessive polymerization for relatively long periods of time.

The resulting products, which comprise one or a plurality of the readily polymerizable unsaturated carbonylic compound of the class described and a substantial amount of a phenolic compound as a polymerization inhibitor, are novel and substantially stable compositions of matter. Said products may be stored for relatively long periods of time and they may be shipped great distances without substantial loss of material due to polymerization during storage and/or transportation. The stabilized unsaturated aldehydes and/or acids alone or in admixture with other materials are useful raw materials in the production of a wide variety of valuable products, and they are particularly valuable raw materials in the production of resins, resinous materials, plastics, coating compositions, etc.

A preferred group of unsaturated carbonylic compounds which may be effectively stabilized against excessive polymerization in accordance with the invention may be conveniently represented by the formula

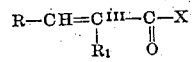

wherein the $C^{III}$ carbon atom is tertiary, that is, a carbon atom linked to three carbon atoms, X represents a hydrogen atom (H) when the compound is an aldehyde and a hydroxy group (OH) when the compound is an acid, R represents a hydrogen atom or a hydrocarbon radical or hydrocarbon radical wherein one or more hydrogen atoms have been substituted by suitable inorganic or organic substituents, and $R_1$ represents a hydrocarbon radical or a substituted hydrocarbon radical.

A subgroup of unsaturated aldehydes and unsaturated acids, which are particularly valuable raw materials in the production of useful resins and coating materials but which have heretofore been extremely difficult to handle due to their instability against polymerization, but which are rendered substantially stable against polymerization in accordance with this invention, are the unsaturated aldehydes and acids of the above-illustrated general formula wherein R represents a hydrogen atom. These very unstable unsaturated carbonylic compounds possess an unsaturated tertiary carbon atom linked by a double bond to a methene radical and by single bonds to a carbon atom of a hydrocarbon radical or substituted hydrocarbon radical and to an aldehyde group or carboxylic acid group. Said compounds may be represented by the formula $$CH_2=C^{III}-C-X$$
$$\quad\;\; | \quad\;\; \|$$
$$\quad\;\; R_1 \quad O$$

wherein the $C^{III}$ carbon atom is tertiary, X represents a hydrogen atom or a hydroxyl group, and $R_1$ represents a hydrocarbon radical or a hydrocarbon radical wherein one or more hydrogen atoms have been substituted by suitable inorganic or organic substituents, as halogen atoms, carbinol groups, alkoxy groups, aralkoxy groups, aryl oxy groups, carboxylic acid groups, amino groups and the like. For example, R and $R_1$ in the general formulas illustrated may represent alkyl radicals as methyl, ethyl, propyl, isopropyl, butyl, isobutyl, secondary butyl, tertiary butyl, amyl, isoamyl, tertiary amyl and the like and their homologues, analogues, and substitution products; aralkyl and aryl radicals as phenyl, benzyl, naphthyl, xylyl and the like which may be substituted; alicyclic radicals as cyclopropyl, cyclobutyl, cyclopentyl, cyclohexyl and the like as well as heterocyclic radicals and unsaturated radicals as ethenyl, propenyl, butenyl, ethinyl, propargyl, styryl and the like and their homologues, analogues and suitable substitution products. As examples of suitable substituted hydrocarbon radicals, R and $R_1$ may represent radicals as $-CH_2Cl, -CH_2OH, -CH_2-CH_2OH, -CH_2-CHOH-CH_3, -COOH,$ 

etc.

Isobutenal $$(CH_2=C-CHO)$$
$$\quad\quad\;\; |$$
$$\quad\quad\;\; CH_3$$

and its homologues are representatives of the class of readily polymerized unsaturated aldehydes which may be substantially stabilized against polymerization in accordance with our process. Isobutenal and its homologues, as well as the corresponding unsaturated acids resulting from their oxidation, on standing even in the absence of oxygen and light at ordinary temperatures are rapidly and substantially completely polymerized to insoluble and useless polymers, said polymerization reaction in general being irreversible. The unsaturated acid of the formula $$CH_2=C-COOH$$
$$\quad\;\; |$$
$$\quad\;\; CH_3$$

resulting from the oxidation of isobutenal, polymerizes with explosive violence. This behavior is quite different from that of the unsaturated acids not possessing this characteristic active structure, since the latter, as well as the corresponding unsaturated aldehydes which do not possess an unsaturated tertiary carbon atom linked directly to the aldehyde group, polymerize less readily and more slowly than those to which this invention relates. We have also found that in the aldehydes of the formula $$CH_2=C-CHO$$
$$\quad\;\; |$$
$$\quad\;\; R_1$$

and in the corresponding acids of the formula $$CH_2=C-COOH$$
$$\quad\;\; |$$
$$\quad\;\; R_1$$

the replacement of both of the hydrogen atoms of the methene radical in the case of the aldehydes and replacement of one of said hydrogen atoms in the case of the acids, and/or replacement of $R_1$ by a hydrogen atom in all cases, materially decreases the tendency of the unsaturated compounds to polymerize.

The stabilization inhibitors employed in the execution of the invention are phenolic compounds. The term "phenolic compound" as used herein and in the appended claims embraces those organic compounds containing an aromatic radical and at least one hydroxyl group, said hydroxyl group being linked directly to a carbon atom embraced in the nucleus of an aromatic radical. The phenolic compounds are the homologues and substitution products of the simplest member of the class, namely, phenol. A phenolic compound may be mono- or poly-hydric, that is, one or more carbon atoms embraced in the same or different aromatic radicals may be linked to hydroxy groups. Other hydrogen atoms of the aromatic compound may be replaced by suitable organic or inorganic substituents.

Suitable phenolic compounds include, among others, the following: phenol, the cresols, the naphthols, the anthrols, the xylenols, cumenol, carvacrol, thymol, eugenol, catechol, resorcinol, hydroquinone, orcinol, guaiacol, phloroglucinol and the like and their homologues and analogues, as well as substitution products as the bromo- and chloro-phenols, -naphthols, -cresols, -anthrols, -xylenols, etc., chlorhydroquinone, dichlorhydroquinone, nitroso-phenol, the nitro-phenols, the amino-phenols, the hydroxy-diaryl ethers, the hydroxy-diaryl alkanes and the like.

The invention is not limited to the use of specific proportions of the polymerization inhibitor. In some cases, the presence of the phenolic compound in an amount of about 0.001% by weight of the material stabilized may be effective, in other cases, it may be desirable to use as much as about 3% by weight of the phenolic body. The amount of the polymerization inhibitor used will generally be dependent upon the specific stabilizing agent, the particular compound or mixture of compounds to be stabilized, the degree of stability desired, and the use to which the stabilized material is to be put. In the majority of cases, the stabilization inhibitors have the desired effectiveness when employed in concentrations of from about 0.002% to about 2% by weight of the unsaturated compound or compounds stabilized.

The phenolic compound may be added to the material in any desirable manner. The phenolic body per se may be added or it may be added in solution or suspension in a suitable solvent. For example, the phenolic bodies may be dissolved in solvents as ethers, alcohols, etc. and the required amount of the solution added to the material to be stabilized. When a phenolic body per se is employed, the specific stabilizer should be selected with respect to the material to be stabilized so that the former is soluble to the required extent in the latter. It is desirable in some cases that the selected polymerization inhibitor should differ in some of its properties from the material stabilized so that it may be separated therefrom by some suitable means as extraction, distillation, etc. In some cases, as when the substantially pure unsaturated compounds are treated, it may be desirable to select a phenolic body which will not cause discoloration of the unsaturated material in which it is dissolved or suspended. For example, although many of the above-mentioned phenolic bodies are equally effective in inhibiting polymerization of isobutenal, the cresols, pyrogallol and hydroquinone being particularly effective and of almost equal effectiveness, hydroquinone is employed in preference to the cresols and pyrogallol when discoloration is to be avoided, for this compound does not cause discoloration. When discoloration is immaterial, any member of the class of inhibitors disclosed may be used.

In accordance with the invention, the material stabilized may comprise one or a plurality of species of unsaturated aldehydes, one or a plurality of species of unsaturated acids or said material may comprise a mixture of one or more unsaturated aldehydes with one or more unsaturated acids. Mixtures of the unsaturated aldehydes and/or acids with organic solvents or diluents, with which said unsaturated compounds may be incorporated or in which said compounds may be prepared, may also be stabilized against polymerization by the addition of the required amount of a mono- or poly-hydroxy aromatic body thereto. Such organic solvents or diluents include among others the aromatic and aralkyl hydrocarbons as benzene, toluene, xylene, ethyl benzene, cymene, etc.; the alicyclic hydrocarbons as cyclohexane, tetrahydrobenzene, etc.; the saturated as well as unsaturated aliphatic hydrocarbons; the hydrocarbon fractions as gasoline, kerosene, etc.; the halogenated hydrocarbons; and the saturated and unsaturated alcohols, aldehydes, ketones, ethers, esters, oxides and the like.

To measure the rates of polymerization of representative readily polymerizable unsaturated aldehydes and unsaturated acids and to demonstrate the effectiveness of representative phenolic compounds in inhibiting said polymerization, a series of tests were made, the results of which are tabulated in the following examples. It is to be understood that the examples are for illustrative purposes and that the invention is not to be regarded as limited to the specific materials stabilized or to the specific inhibiting agents therein recited.

*Example I*

Samples of substantially the same volume were drawn from a freshly prepared stock of isobutenal, placed in glass sample bottles, and stabilized by the addition thereto of different amounts of pyrogallol. After addition of the weighed amount of pyrogallol, the bottles were stoppered and allowed to stand, the rate of polymerization being determined by the time required for the contents of the respective bottles to solidify. The results are given in the following table for comparison, the behavior of the untreated isobutenal also being cited.

*Isobutenal stabilized with pyrogallol*

| Pyrogallol | | | Rate of polymerization | |
|---|---|---|---|---|
| Percent by weight | Container | Temperature | Time from start | Observation |
| None | Brown glass | About 20° C | 4 hours | Murky |
| | | | 1 day | Solid layer present |
| | | | 4 days | Completely solid |
| 0.0095 | Brown glass | About 20° C | 1 day | Clear |
| | | | 6 days | Clear |
| | | | 13 days | Clear |
| | | | 47 days | Completely solid |
| 0.0196 | Brown glass | About 20° C | 1 day | Clear |
| | | | 6 days | Clear |
| | | | 13 days | Clear |
| | | | 47 days | Completely solid |
| 0.0298 | Brown glass | About 20° C | 1 day | Clear |
| | | | 7 days | Clear |
| | | | 15 days | Clear. Some flocculent matter |
| | | | 47 days | 80% solid |
| | | | 77 days | Completely solid |
| 0.0396 | Brown glass | About 20° C | 1 day | Clear |
| | | | 7 days | Clear |
| | | | 15 days | Murky |
| | | | 47 days | Murky. No solid present. |
| | | | 77 days | Viscous and opaque. No solid |
| 0.1050 | Brown glass | About 20° C | 1 day | Clear |
| | | | 7 days | Clear |
| | | | 15 days | Clear |
| | | | 52 days | Very slightly murky |
| | | | 77 days | No change |
| | | | 106 days | No change |
| | | | 269 days | No change |
| 0.2600 | Brown glass | About 20° C | 52 days | Clear |
| | | | 77 days | Clear |
| | | | 106 days | Clear |
| | | | 269 days | Clear |
| None | Brown glass | About 60° C | 1 hour | Murky |
| | | | 15 hours | Completely solid |
| 0.0500 | Brown glass | About 60° C | 16 hours | Clear |
| | | | 40 hours | 50% solid |
| | | Cooled to about 20° C | 5 days | Over 90% solid |
| | | | 47 days | Completely solid |
| 0.0493 | Clear glass | In sunlight | 1 day | Clear. Yellow |
| | | | 2 days | Clear |
| | | | 67 hours | Solid |
| 0.0480 | Clear glass | Diffused light | 1 day | Clear. Yellow |
| | | | 15 days | Clear. Some flocculent material |
| | | | 106 days | No change |

The homologues of isobutenal can be treated in substantially the same manner and stabilized against excessive polymerization for relatively long periods of time. Other phenolic compounds may be used with comparable effectiveness, and other proportions of the polymerization inhibitor may be employed.

Example II

Different samples drawn from a freshly prepared stock of isobutenal were treated with different amounts of hydroquinone and the rate of polymerization observed. The results and conditions of the tests are given in the following table.

$$CH_2=C-COOH, \quad CH_2=C-COOH$$
$$\quad\quad\quad | \quad\quad\quad\quad\quad\quad\quad | $$
$$\quad\quad\quad C_2H_5 \quad\quad\quad\quad\quad C_4H_9$$

Isobutenal stabilized with hydroquinone

| Hydroquinone | | Rate of Polymerization | | |
|---|---|---|---|---|
| Percent by weight | Container | Temperature | Time from start | Observation |
| None | Brown glass | About 20° C | 1 day | Solid layer |
|  |  |  | 4 days | Completely solid |
| 0.0095 | Brown glass | About 20° C | 1 day | Clear |
|  |  |  | 7 days | Clear |
|  |  |  | 15 days | Clear |
|  |  |  | 47 days | Completely solid |
| 0.0495 | Brown glass | About 20° C | 47 days | Clear |
|  |  |  | 77 days | Clear |
|  |  |  | 106 days | No change |
|  |  |  | 269 days | No change |
| 0.0990 | Brown glass | About 20° C | 47 days | Clear |
|  |  |  | 77 days | Clear |
|  |  |  | 106 days | Clear |
|  |  |  | 269 days | Clear |

The tabulated results show that hydroquinone is a very effective agent for substantially inhibiting the polymerization of the readily polymerizable isobutenal, and that the hydroquinone is effective in widely varying concentrations.

Example III

A 25 c. c. sample of about a 50% by weight solution of the acid $$CH_2=C-COOH$$
$$\quad\quad | $$
$$\quad\quad CH_3$$

in benzol was placed in each of a series of brown glass sample bottles. To each bottle, a weighed amount of a different material was added to determine its effectiveness in inhibiting the polymerization of the readily polymerizable unsaturated acid. The bottles were then tightly stoppered and allowed to stand at room temperature for about 24 days, after which time the extent of polymerization was observed. The results are shown in the following table for comparison. The behavior of the untreated acid solution is also cited.

| Inhibitor wht., c. c. | Inhibitor/25 benzol soln. | Inhibitor percent by wht. of acid | Temperature | Extent of polymerization in 24 days |
|---|---|---|---|---|
|  | Gm. |  |  |  |
| None |  |  | About 20° C. | Opaque solid. Benzol layer on top |
| Diphenylamine | 0.100 | 0.956 | do | Clear solid. Benzol layer on top |
| Thiocresol | 0.419 | 4.00 |  | Do. |
| Propionitrile | 0.086 | 0.820 |  | Opaque solid. Benzol layer on top |
| Thiophenol | 0.167 | 1.60 |  | Do. |
| Hydroquinone | 0.111 | 1.06 |  | No solid present |
| Pyrogallol | 0.151 | 1.44 |  | Do. |

It is seen from the above table, that of the materials tested, the representative phenolic compounds, namely, pyrogallol and hydroquinone, were the only materials effective in inhibiting the polymerization of the unsaturated acid. A wide variety of other phenolic compounds were tested and found to be desirable polymerization inhibitors when used with the acid $$CH_2=C-COOH$$
$$\quad\quad | $$
$$\quad\quad CH_3$$

as well as its homologues and substitution products as $$CH_2=C-COOH, \quad CH_2=C-COOH, \quad CH_2=C-COOH, \quad CH_2=C-COOH, \quad CH_2=C-COOH$$
$$\quad\quad | \quad\quad\quad\quad\quad | \quad\quad\quad\quad\quad | \quad\quad\quad\quad\quad\quad | \quad\quad\quad\quad\quad\quad | $$
$$\quad C_2H_5 \quad\quad\quad C_4H_9 \quad\quad\quad\text{(phenyl)} \quad\quad CH_2OH \quad\quad\quad CH_2Cl$$

and the like.

While we have described our invention in a detailed manner and provided examples illustrating suitable modes of executing the same, it is to be understood that modifications may be made and that no limitations other than those imposed by the scope of the appended claims are intended.

We claim as our invention:

1. A composition of matter comprising a compound of the formula $$CH_2=C-CO-X$$
$$\quad\quad\quad | $$
$$\quad\quad\quad R$$

wherein R is a substituent of the class consisting of the methyl, ethyl, butyl, phenyl, carbinol and chloromethyl groups and X is a substituent of the group consisting of H and OH, stabilized by the presence of from about 0.002% to about 2% of a phenolic compound of the group consisting of hydroquinone and pyrogallol.

2. A composition of matter comprising a compound of the formula $$CH_2=C-CO-X$$
$$\quad\quad\quad | $$
$$\quad\quad\quad CH_3$$

wherein X is a substituent of the group consisting of H and OH, stabilized by the presence of from about 0.002% to 2% of a phenolic compound of the group consisting of hydroquinone and pyrogallol.

3. The unsaturated acid of the formula $$CH_2=C-COOH$$
$$\quad\quad | $$
$$\quad\quad CH_3$$

stabilized by the presence of from about 0.002% to about 2% of a phenolic compound of the group consisting of hydroquinone and pyrogallol.

4. The unsaturated aldehyde of the formula $$CH_2=C-CHO$$
$$\quad\quad | $$
$$\quad\quad CH_3$$

stabilized by the presence of from about 0.002% to about 2% of a phenolic compound of the group consisting of hydroquinone and pyrogallol.

HERBERT P. A. GROLL.
GEORGE HEARNE.